SEGMENTAL MOLD
Filed Feb. 26, 1957
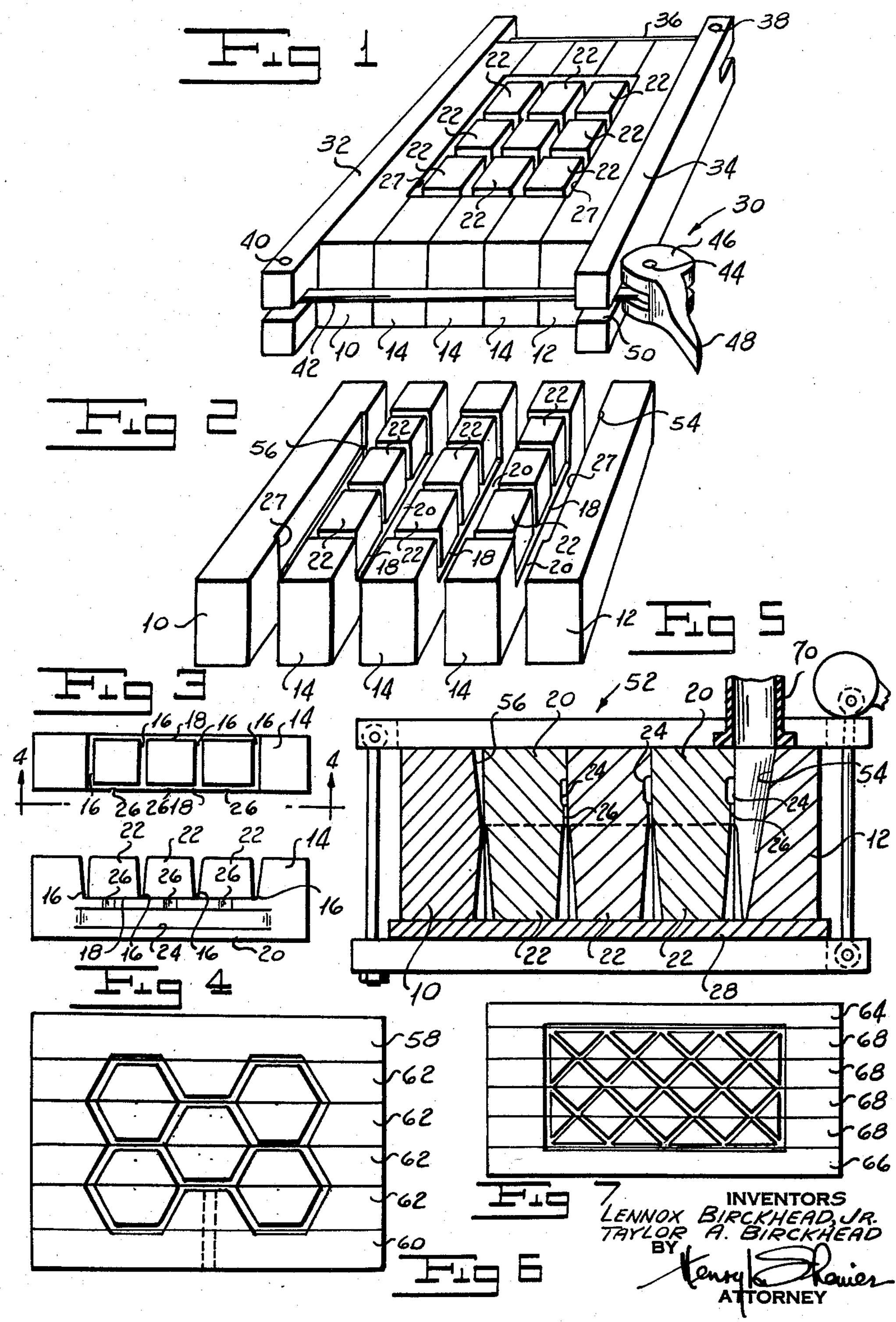
INVENTORS
LENNOX BIRCKHEAD, JR.
TAYLOR A. BIRCKHEAD
BY
ATTORNEY United States Patent Office 2,924,851

Patented Feb. 16, 1960

2,924,851

SEGMENTAL MOLD

Lennox Birckhead, Jr., and Taylor A. Birckhead, Baltimore, Md., assignors to Birckhead Corporation, Baltimore, Md., a corporation of Maryland Application February 26, 1957, Serial No. 642,435

3 Claims. (Cl. 18—42)

Our invention relates to a segmental mold and more particularly to a segmental mold which is less expensive and which is more convenient to use than molds of the prior art.

In the prior art in the manufacture of large and intricate plastic moldings such as light diffusing lattices and the like the cost of the mold required is a relatively large percentage of the cost of producing the articles. The molds employed require extensive and difficult machining operations to produce the desired pattern in the finished product. In the prior art each mold is capable of producing articles of only one size and only one pattern. Consequently for each job of a different size or pattern a new mold must be made. Owing to the difficulty of ejecting a finished molding from a mold of the prior art the molds must be formed with a relatively high draft. This results in thick and heavy moldings requiring a large amount of expensive molding material. Further difficulty has been experienced in the prior art in eliminating entrained air or vapor from the molding material in the course of the molding operation.

We have invented a segmental mold which overcomes the problems of the prior art discussed hereinabove. All the sections making up our segmental mold are more readily formed than is a single mold of the prior art. Consequently our segmental mold is less expensive than a mold of the prior art. Segments of our segmental mold may be combined to produce moldings of different sizes and of various patterns. Ejection of a completed molding is readily accomplished with our segmental mold to permit the formation of more delicate moldings requiring less material than is required to form moldings with molds of the prior art. The difficulty of eliminating entrained air and vapor of molds of the prior art is greatly reduced by our segmental mold.

One object of our invention is to produce a segmental mold which is less expensive than molds of the prior art.

Another object of our invention is to provide a segmental mold which is adapted to form a variety of sizes and shapes of moldings.

Still another object of our invention is to provide a segmental mold which permits ready ejection of the finished molding from the mold.

A further object of our invention is to provide a segmental mold which greatly reduces the difficulty encountered in the prior art of eliminating entrained air and vapor from the molding material in the course of the molding operation.

Other and further objects of our invention will appear from the following description.

In general our invention contemplates the provision of a segmental mold made up of a pair of end mold segments and a plurality of intermediate mold segments. We machine each of the intermediate segments to provide a base carrying a plurality of core elements. The ends sections of the mold are machined as required with a recess to complete the mold space. When the sections are clamped together the intermediate sections with the core elements and the end sections define the mold space required to produce the desired finished product. We groove each of the intermediate segment bases along its length to provide a space into which air and vapor entrained in the molding material may escape. A plurality of small spaced passages permit this fluid to flow from the mold space into the space provided by the groove. We form the respective end sections with a gate sprue to admit material to the mold space and with a riser sprue which permits rapid egress of air as material flows into the mold space.

In the accompanying drawings which form part of the instant specification and which are to be read in conjunction therewith and in which like reference numerals are used to indicate like parts in the various views:

Figure 1 is a perspective view of one form of our segmental mold with the mold segments assembled.

Figure 2 is an exploded view of our segmental mold.

Figure 3 is a plan view of a segment of one form of our segmental mold.

Figure 4 is a side elevation of the form of our segmental mold shown in Figure 3 taken along the line 4—4 of Figure 3.

Figure 5 is a sectional view of our segmental mold ready to receive molding material.

Figure 6 is a plan view of a second form of our segmental mold.

Figure 7 is a plan view of a further form of our segmental mold.

Referring more particularly to Figures 1 to 5 of the drawings, one form of our segmental mold includes respective end mold segments or sections 10 and 12 and a plurality of intermediate sections or segments 14. In this form of our mold we machine each of the members 14 transversely of its length to provide a number of spaced cuts 16. We then machine the respective sides of the segments 14 between the first and last cut 16 to provide a pair of shoulders 18. The operations described may be performed on any suitable machine tool such for example as a milling machine. These operations provide each of the segments 14 with a base 20 and a plurality of core elements 22 separated by the cuts 16. It is to be noted that we taper each of the core elements 22 from the shouders 18 and from the bases of cuts 16 to the ends of the core elements. This draft or taper need only be very small in our sectional mold. It may for example be only a one degree taper and yet will permit ready ejection of a delicate molding in the manner to be described hereinafter.

We machine each of the sections 14 along one of the sides of the base 20 to form a groove 24 into which air and vapor entrained in the molding material may escape. A plurality of bleeder openings 26 permit the gaseous fluid to pass from the mold space to the space provided by the grooves 24.

We mill or otherwise form a longitudinally extending recess 27 in the inboard face of each of the end members 10 and 12 to complete the mold space. The provision of these recesses permits the intermediate members to be made interchangeable with cuts of the same depth along the sides of all these members. It is to be understood that we could as well make the cuts in the outboard sides of the outer members 14 twice the depth of the cuts on the inboard sides of these members and form members 10 and 12 with no recesses 27. Preferably however we form the members in the manner described for complete interchangeability of parts 14.

Any convenient means known to the art may be employed to clamp the sections of the mold together and to clamp the assembled mold to a base plate 28. For example a clamp indicated generally by the reference character 30 may be employed to clamp the members together. Clamp 30 has a pair of sides 32 and 34 connected at corresponding ends by a stud rod 36 screwed at one end into side 32 and pivotally connected to side 34 by a pin 38. A pin 40 pivotally connects one end of a rod 42 to the end of side 32 remote from rod 36. A pin 44 pivotally connects the other end of rod 42 to a cam 46 formed or otherwise provided with an actuating arm 48. It will be seen that with sides 32 and 34 in engagement with the end sections 10 and 12 rod 42 may be swung into a slot 50 in side 34 to position cam 46 to engage the outboard surface of side 34. Arm 48 may then be moved to cause cam 46 to draw sides 32 and 34 together firmly to hold the mold segments assembled. A clamp indicated generally by the reference character 52 similar to the clamp 30 may be used to clamp the plate 28 between one of its sides and the mold assembly.

We form one of the end sections or segments such, for example, as the segment 12 with a tapering gate sprue 54 leading from the top of the assembled mold to the mold space. A riser sprue 56 formed in the other end section 10 permits molding material to come into view thus assuring that all air has escaped and that the mold is completely filled. A tube held against the tube of the mold in registry with the gate sprue 54 introduces the molding material such as fluid plastic under the required pressure into the mold space.

From the foregoing it will be seen that the form of our segmental mold shown in Figures 1 to 5 defines a mold space for producing a rectangular lattice work. For purposes of convenience we have shown only three intermediate segments 14. It is to be understood that in practice many more segments and segments of greater length with many more core elements are used to form a product of the desired size.

Referring to Figure 6 we have shown a form of our segmental mold including end members 58 and 60 and intermediate strips and sections 62 which are cut to form a hexagonal latticework. Figure 7 shows a form of our segmental mold including end members 64 and 66 and intermediate members 68 cut to give a diamond pattern. From these few examples it will be appreciated that we may cut the segments of our mold to form a wide variety of patterns such for example as a brick work pattern. It will be further understood that we may if desired combine differently cut segments to form a great number of complex patterns.

In use of our segmental mold a pair of mold end sections such for example as sections 10 and 12 and a number of intermediate segments such as the segments 14 required to produce a finished product of the desired configuration and size are racked up in alignment with each other and clamp 30 is wrapped around the assembly and actuated to hold the members or sections firmly together. When this has been done the assembly is placed on the base plate 28 with the end faces of the core elements 22 in surface contact with the plate surface. Clamp 52 is employed to hold plate 28 firmly to the mold assembly. Fluid plastic is introduced under the required pressure through tube 70 into the gate sprue 54. This plastic charge rapidly flows throughout the mold space. A sufficient charge of plastic is forced into the mold to cause a small amount of material to flow into riser sprue 56 to ensure that the mold space is completely filled. In the course of flow of material throughout the mold, bleeder openings 26 permit the flow of the mixture to eject bubbles such as entrained air and water vapor from the mold space into the spaces provided by grooves 24.

After the material has been placed in the mold the sprues are closed by means of Teflon plugs or the like and the curing operation is performed. After curing we remove clamps 30 and 52 and plate 28. In ejecting the molded article from our segmental mold we employ any convenient means such as an automatic arbor press to punch the sections of the mold one-by-one out of the molded article. As has been explained hereinabove, owing to the fact that the segmental mold permits ejection of the article in this manner, our mold is not required to have the degree of draft required in molds of the prior art to permit ejection. As a result we may form a more delicate and lighter latticework than can be formed by use of molds of the prior art. It will be appreciated that this lighter article requires less material for its formation.

It will be seen that we have accomplished the objects of our invention. We have produced a segmental mold which is less expensive than molds of the prior art. Our mold may be used to make articles in a wide variety of configurations and sizes. It greatly reduces the difficulty of eliminating air and entrained vapor encountered in molds of the prior art. It does not require the high degree of draft necessary in molds of the prior art to permit ejection of formed articles. As a result more delicate articles requiring less material may be formed with our mold.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A segmental mold including in combination a pair of end mold sections each having a base and a portion formed with a recess extending in the direction of the length of said base, a plurality of respective integral elongated intermediate mold sections, each of said elongated intermediate sections comprising a base and a plurality of core elements tapered in a direction from said base to the ends of the elements and separated by slots extending transversely of the section base and means for releasably securing said mold sections in assembled relationship with the slot ends of adjacent intermediate section slots registering with each other to cause said sections and said core elements to define a continuous unitary mold space including said end section recesses and surrounding all of said core elements.

2. A segmental mold as in claim 1 in which the base of each section is formed with a groove along its length and bleeder passages providing communication between said groove and said mold space and in which the respective end mold sections are provided with a riser sprue and a gate sprue.

3. A segmental mold as in claim 1 including a base plate and means for assemblying said base plate with said mold sections to enclose the mold space.

References Cited in the file of this patent

UNITED STATES PATENTS

| | | |
|---|---|---|
| 257,719 | Kearsing | May 9, 1882 |
| 1,751,369 | Swift | Mar. 18, 1930 |
| 1,897,023 | Schirmer | Feb. 7, 1933 |
| 2,378,586 | Schultz | June 19, 1945 |
| 2,566,817 | Yellin | Sept. 4, 1951 |